United States Patent Office 3,168,535
Patented Feb. 2, 1965

3,168,535
PREPARATION OF CRYSTALLINE VITAMIN
D₃ AND VITAMIN D₃ BENZOATE
Kekhusroo R. Bharucha, Toronto, Ontario, and Frank M.
Martin, Rexdale, Ontario, Canada, assignors to Canada
Packers Limited, Toronto, Ontario, Canada
No Drawing. Filed Sept. 11, 1962, Ser. No. 222,972
19 Claims. (Cl. 260—397.2)

This invention relates to the production of crystalline vitamin D₃ and, more specifically, to a novel process for its preparation. The invention also relates to the production of the new compound, vitamin D₃ benzoate, which is an important intermediate for the preparation of crystalline vitamin D₃ and, in addition, possesses valuable vitamin D₃ activity per se.

Vitamin D₃ is conventionally prepared by the irradiation of 7-dehydrocholesterol. The irradiated material, after removal of the solvent employed in the irradiation process, is then dissolved in ethanol, which is cooled to a relatively low temperature and filtered. Vitamin D₃ will remain in the cooled alcoholic solvent, whereas the bulk of the unconverted 7-dehydrocholesterol (hereinafter designated as "provitamin"), will crystallize at the low temperature and will be separated from the solution by the filtration procedure. Following evaporation of the filtrate, a crude gum containing about 30% or more of vitamin D₃ along with further quantities of provitamin and impurities is recovered.

For many purposes, including the preparation of poultry feeds and the like, this crude gum can be utilized for its vitamin D₃ content without further purification. For certain purposes such as pharmaceutical uses, fortification of milk, etc., a pure crystalline form of the vitamin is desirable.

The isolation of crystalline vitamin D₃ from the mixture of products obtained from the irradiation of its provitamin (7-dehydrocholesterol) is dependent upon the use of a crystalline intermediate. Heretofore, the highly crystalline 3,5-dinitrobenzoate derivative was employed to this end. However, the expensive nature of this reagent, combined with the low yield of product obtained from the methods employed, resulted in a high-cost process.

In our copending application Serial Number 222,945, filed concurrently herewith, we have disclosed a novel method of increasing the vitamin content of the irradiation mixture prior to esterification. This vitamin enrichment results in a much higher recovery of vitamin ester.

In the copending application, it is disclosed that the irradiation mixture contains a provitamin-vitamin adduct which can be readily isolated, and which by its very nature is relatively free from other irradiation products and therefore lends itself to the facile procurement of the vitamin 3,5-dinitrobenzoate in excellent yield. It is also disclosed that the crude irradiation mixture, after removal of most of the unreacted provitamin and the adduct mentioned above, can be vitamin enriched by a partitioning process between a pair of immiscible solvents thus resulting in over twice the yield of vitamin D₃ ester as that obtained from the same amount of crude gum utilized without recourse to the partitioning step.

In accordance with the present invention, it has been found that a much less expensive reagent, namely, benzoyl chloride, may be utilized for the esterification. The use of 3,5-dinitrobenzoyl chloride and production of the vitamin 3,5-dinitrobenzoate as an intermediate in the isolation of crystalline vitamin D₃ has heretofore been dictated by the high degree of crystallinity of this ester and consequent ease of isolation and purification. It has now been discovered that vitamin D₃ benzoate, a new compound, may be obtained in crystalline form and that this compound may be utilized as an intermediate for the isolation of crystalline vitamin D₃, provided proper techniques are employed. The present process enables this to be accomplished.

It is an object of the present invention to provide a new process for the production of crystalline vitamin D₃.

Another object of the invention is to provide a new and useful intermediate compound, namely, substantially pure crystalline vitamin D₃ benzoate.

Another object of the invention is to provide a novel and effective method for converting the vitamin D₃ benzoate intermediate to vitamin D₃.

A still further object of the invention is to enable crystalline vitamin D₃ to be manufactured in good yield without the necessity of preparing the 3,5-dinitrobenzoate.

Vitamin D₃ benzoate can be produced from substantially any vitamin D₃-containing source material. However, higher yields of the crystalline ester are obtained from source materials which have been treated to remove impurities, such as other irradiation products of an irradiation mixture, and/or which have been enriched in vitamin D₃ content. Crystalline vitamin D₃ benzoate can be obtained in low yield by esterification of an ethanol treated irradiation gum (i.e. an irradiation mixture from which a substantial amount of the provitamin has been removed). Excellent yields are obtained by using an enriched vitamin D₃-provitamin adduct isolated from the irradiation mixture by the procedure set forth in the aforementioned copending application. Vitamin enrichment of the residual gum (from which the adduct has been removed) as by partitioning between an immiscible solvent pair, prior to esterification, also results in a good recovery of the crystalline vitamin benzoate. This method of enrichment is also disclosed in the aforementioned copending application.

Briefly, the vitamin D₃-provitamin adduct is prepared by dissolving an ethanol-treated irradiation gum in warm methanol followed by cooling to produce a precipitate. This precipitate is the crude adduct. After filtering and washing with methanol, the crude adduct is enriched in vitamin D₃ content by cleaving, at least in part, with a polar solvent such as acetone or methanol, the latter being used in relatively large volume. Provitamin crystallizes from the polar solvent since it is only loosely held in the adduct. Evaporation of the mother liquor provides an enriched vitamin D₃-material which is then subjected to esterification to provide a mixture of the benzoates of the vitamin and remaining provitamin. The provitamin ester may be separated by fractional crystallizations and hydrolyzed to provide provitamin for reuse. Vitamin D₃ benzoate obtained from the mother liquor is purified as by chromatography and is crystallized from a suitable solvent.

Evaporation of the methanol solution from which the adduct has been precipitated provides a gum enriched in vitamin D₃-content but containing other irradiation products which interfere with isolation of the vitamin by reducing the amount of crystalline intermediate obtainable upon esterification. Accordingly, this gum is preferably partitioned by treatment with a pair of immiscible solvents as described in detail in the aforementioned copending application.

When the crude provitamin and adduct-freed gum is partitioned between a pair of immiscible solvents (i.e., hexane and 91% aqueous methanol) the more polar solvent selectively removes impurities including those which absorb lower in the ultraviolet than the vitamin. When esterification of such a vitamin-enriched hexane fraction was carried out in the 3,5-dinitrobenzoate series, a much higher yield of crystalline vitamin ester was obtained. We have found that a similar relationship exists in the benzoate series and that the crystalline vitamin $D_3$ benzoate can be obtained in almost two and one-half times the yield, on a crude vitamin gum basis, than that using non-partitioned gum.

The vitamin $D_3$ source material from the sources set forth above, or from other sources available in the art, is esterified with an excess of benzoyl chloride in benzene-pyridine, or other suitable organic solvent medium including an HCl acceptor, to provide vitamin $D_3$ benzoate usually containing some provitamin benzoate. In lieu of benzoyl chloride, other reagents providing the benzoyl moiety, such as benzoic anhydride may be employed.

Where benzoyl chloride is employed, it has been found that the excess acid chloride following the esterification reaction may be readily removed by washing the reaction mixture with aqueous hydrazine solution. (When 3,5-dinitrobenzoyl chloride is employed, as in the conventional process, the removal of the excess reagent is no problem since 3,5-dinitrobenzoyl chloride is easily attacked by alkali, in contrast to benzoyl chloride, which is more resistant.) It has been found that hydrazine reacts very rapidly with benzoyl chloride to form the hydrazide, which is water-soluble and hence easily removed.

After removal of excess reagent and evaporation of the solvent, the residue, which usually comprises a mixture of the benzoates of vitamin $D_3$ and provitamin, is dissolved in hexane or other selective solvent, and the more insoluble provitamin benzoate is separated by cooling and crystallization. After evaporation of the hexane, the residue, which contains, e.g., over 70% of vitamin $D_3$ benzoate, is further purified as by crystallization from a solvent, such as dioxane-methanol. Vitamin $D_3$ benzoate deposits as a solid of relatively high purity, e.g., 90% or higher. This product may be used directly as a concentrated source of vitamin $D_3$.

It has been found essential that the vitamin $D_3$ benzoate be provided in a suitable state of purity before vitamin $D_3$ regenerated therefrom will crystallize. This purification is accomplished by chromatography over a suitable adsorbent, many types of which are commercially available. Satisfactory results have been obtained with neutral alumina. Excellent results have been obtained with a synthetic magnesium silicate adsorbent, e.g., such as that manufactured under U.S. Patent 2,393,625 and marketed under the name Florisil. The vitamin ester is least strongly adsorbed and is eluted from the adsorbent column with an organic solvent such as hexane, optionally containing a little benzene. Further crystallizations from dioxane-methanol give substantially pure crystalline vitamin $D_3$ benzoate.

It will be understood that other organic solvents may be used in the purification steps. For example, the vitamin $D_3$ benzoate can be crystallized from such common organic solvents as ethyl acetate, ether, acetone, hexane, hexane-ethanol, etc. Dioxane-methanol, however, is the preferred solvent for this crystallization.

In achieving the purification of the vitamin $D_3$ benzoate by chromatography with synthetic magnesium silicate, it has further been found to be advantageous to use at least about 15 parts by weight of adsorbent to one part by weight of vitamin ester. The use of smaller ratios of adsorbent to vitamin ester may lead to a non-crystallizable vitamin froth upon subsequent conversion of the ester to the alcohol, apparently due to insufficient purity of the benzoate. However, it will be understood that other purification procedures may be utilized in the process of the invention, provided a sufficiently pure vitamin $D_3$ benzoate is obtained.

Following the recovery of the purified crystalline vitamin $D_3$ benzoate, this material is converted to the alcohol. However, this is not readily accomplished by ordinary saponification conditions since the benzoate, unlike the 3,5-dinitrobenzoate, requires drastic conditions for splitting and the resulting free vitamin is sensitive to strong bases at elevated temperatures and to acid at all temperatures. Yields up to 19% of crystalline vitamin $D_3$ have been obtained by hydrolyzing the vitamin $D_3$ benzoate with hot methanolic KOH, followed by crystallization of the vitamin froth.

In accordance with a further feature of the present invention, it has been found that far greater yields of the free vitamin may be obtained by utilizing reductive cleavage of the ester. Thus, substantially 100% conversion to free vitamin may be obtained by reduction of the pure crystalline vitamin $D_3$ benzoate with lithium aluminum hydride and a yield of 80% or more of crystalline vitamin $D_3$ may be obtained after crystallization from solvents. Benzyl alcohol is the only by-product formed, and this is easily removed as by washing the hexane solution of the vitamin with water containing a little ethanol. The $LiAlH_4$ reduction is simple, clean, fast, is carried out at room temperature or preferably below and gives in nearly quantitative yield, free vitamin $D_3$ in a sufficiently high state of purity to undergo readily crystallization from aqueous acetone. The reductive cleavage may be carried out with the $LiAlH_4$ in ether solution. Similar solvents such as tetrahydrofuran, dimethyl glycol ether, etc., may also be used.

It will be understood that the reductive cleavage may be effected by using other mixed metal hydrides such as lithium borohydride. It is preferred, however, to utilize lithium aluminum hydride which, as has heretofore been stated, provides almost theoretical yields of the alcohol, which after crystallization provides a high recovery of crystalline vitamin $D_3$.

The invention will be further illustrated by the following examples of practice:

EXAMPLE 1.—PREPARATION OF ADDUCT

Vitamin $D_3$ ethanol gum (309 g.) prepared in the conventional manner, was dissolved in distilled methanol (635 ml.) by warming almost to boiling. This was left at $-18°$ C. overnight and produced a crystalline precipitate of vitamin $D_3$-provitamin adduct. This was filtered off in a cold-room, washed with cold ($-18°$ C.) methanol, and dried in vacuo ($25°$ C.) to a constant weight of 107.5 g. (34.8% by weight) of vitamin $D_3$-provitamin adduct having a vitamin $D_3$ content of 31%. Evaporation of the methanol mother liquor provided a "methanol gum" having a vitamin $D_3$ content of 42%.

The 107.5 g. of adduct was dissolved in purified acetone (322 ml.) by warming and was then left to sit in the dark at room temperature for 25 hours. Needle-like crystals formed. These were filtered off, washed with cold acetone and dried in vacuo ($25°$ C.) 26.13 g. of crystalline material which was found to be 100% pure provitamin (24.3% from the adduct) was obtained. This material was set aside for reuse in the irradiation process, or for other use as desired.

The acetone mother liquor was evaporated to an amber resin in vacuo ($25°$ C.). The resin was dissolved in hexane and again taken down in vacuo to give 84.76 g. of enriched vitamin $D_3$-provitamin adduct.

The light absorption of this material in ethanol was as follows:

| | | | |
|---|---|---|---|
| $\lambda$ max. | 265 (sh.) | 268–270 | With inflections at 280 and 294 m$\mu$. |
| $E \frac{1\%}{1\ cm.}$ | | 299 | 302 |

(Note.—sh. stands for shoulder.)

EXAMPLE 2.—PREPARATION OF VITAMIN $D_3$ BENZOATE

The 84.76 g. adduct (81.37 g. actual content) from Example 1 was dissolved in purified (thiophene-free) benzene (310 ml.), diluted with dry distilled pyridine (99 ml.) and cooled at 0° C. Distilled benzoyl chloride (29.2 ml.; 1.15 molar proportions) was then added over 10 minutes to the magnetically stirred solution. The mixture (from which pyridine hydrochloride began to separate almost immediately) was placed in the refrigerator for 16 hours. The pyridine hydrochloride was filtered off and washed well with benzene. The benzene solution was then washed three times with 10% HCl, water, saturated $NaHCO_3$, water, twice with 15% hydrazine hydrate solution (250 ml. each time) and twice with water to neutrality. The dried ($Na_2SO_4$) benzene solution was evaporated in vacuo (25°) to a transparent amber resin. This was dissolved in hexane and again taken down in vacuo to give 102.12 g. (98.8%) of a semi-solid.

Infrared examination showed that the esterification was complete and that no acid chloride had survived the washing procedure.

The crude mixture of vitamin and provitamin benzoates was dissolved in distilled hexane (185 ml.) by warming under $N_2$.

After 16 hours in the refrigerator the provitamin benzoate (13.70 g.; ca. 82% pure) was filtered off, washed with cold hexane and dried in vacuo (25°).

The mother liquor was evaporated to a light amber-colored resin in vacuo (25°) which weighed 85.82 g. (ca. 72% vitamin benzoate). This was dissolved in purified dioxane (180 ml.) by warming on the steam-bath under $N_2$, diluted with distilled methanol (210 ml.), seeded and refrigerated. Over the next four days a further 200 ml. of methanol was added. The crystals were then filtered off, washed with cold dioxane-methanol (1:2) and dried in vacuo (25°). The pale yellow crystals weighed 49.42 g. and were 93% pure vitamin benzoate. The mother liquor was evaporated to an amber-colored resin which weighed 36.10 g. from which additional vitamin benzoate could be recovered.

EXAMPLE 3.—FLORISIL CHROMATOGRAPHY OF VITAMIN $D_3$ BENZOATE

A portion of the 93% pure crystalline benzoate from Example 2 (30.0 g.) in distilled hexane (200 ml.) was adsorbed on a column of Florisil (200 g.). The column was developed with hexane (200 ml.) and the elution was continued as follows:

Fraction 1

Distilled hexane (1800 ml.) gave 25.57 g. partly crystalline colourless product. Most of material (ca. 20–22 g.) eluted in the first 500 ml. hexane.

Crystallization from dioxane (44.3 ml.) and methanol (73.5 ml.) gave 23.52 g. M.P. 106–108° sinters 104° C.

Light absorption in isooctane:

| $\lambda$ max | 222.5 | 228 | 266 | |
|---|---|---|---|---|
| $E_{1\,cm.}^{1\%}$ | 488 | 484 | 387 | (95.7% pure.) |

Additional fractions were obtained from the column, which upon crystallization with dioxane-methanol yielded a less pure product than Fraction I.

Fraction I was recrystallized from dioxane (40 ml.)-methanol (58.5 ml.) and gave 21.85 g. M.P. 104–106° C. (102.5° sinters). $[\alpha]_D^{24} + 97.77°$ (c.=1.0125 $CHCl_3$).

Light absorption in isooctane:

| $\lambda$ max | 225.5 | 227.5 | 266.5 | |
|---|---|---|---|---|
| $E_{1\,cm.}^{1\%}$ | 494 | 492 | 392 | (97% pure.) |

This product, which, from the rotation and melt, was considered less pure than desirable for preparation of the free vitamin, was therefore subjected to rechromatography on "Florisil" using a larger ratio of Florisil to steroid.

A portion of the ester from above (14.0 g.) in hexane (50 ml.) was adsorbed on a column of Florisil (210 g.) and eluted as follows:

Fraction I–A

Hexane (2300 ml.) gave 9.23 g. colourless solid which upon crystallization from dioxane (15.6 ml.) and methanol (23 ml.) gave 8.72 g. M.P. 108–109° C. (107 sinters), $[\alpha]_D^{25} + 104.13$ (c.=0.859 in $CHCl_3$).

Light absorption in isooctane:

| $\lambda$ max | 222 | 227.5 | 266 |
|---|---|---|---|
| $E_{1\,cm.}^{1\%}$ | 498 | 480 | 402 |

This product was substantially pure. Further fractions gave vitamin benzoate of lower purity.

EXAMPLE 4.—$LiAlH_4$ REDUCTION OF VITAMIN $D_3$ BENZOATE

A portion of the crystallized product from Fraction I–A (5.6 g.) was dissolved in dry ether (48 ml.), and added dropwise to a magnetically stirred mixture of $LiAlH_4$ (0.56 g.) in dry ether (35 ml.) at −18° C. over a period of 20 mins. After a further 30 mins. stirring at −14° C., purified ethyl acetate (2.1 ml.) was added dropwise over 5 minutes. The mixture during this addition gradually thickened until stirring became impossible. After a further 5 minutes a saturated aqueous $NH_4Cl$ solution (8.0 ml.) was added dropwise during a five-minute period and the colourless solution, from which a precipitate had separated, was dried over $Na_2SO_4$ and the solids filtered off and washed well with dry ether. The ether solution was washed twice with distilled water and the ether evaporated off. The residue was dissolved in hexane and again taken down in vacuo. The residue was dissolved in distilled hexane (120 ml.) and washed 6 times with 120 ml. portions of a water-ethanol solution (9:1) saturated with hexane (to remove the benzyl alcohol formed in the reduction). After a final water wash, the dried ($Na_2SO_4$) hexane solution was evaporated to a froth (25°/10 mm.), which weighed 4.32 g. (98.5%) $[\alpha]_D^{25} = +80.53°$ (c.=0.755 in acetone).

Light absorption in ethanol:

$$E_{1\,cm.}^{1\%} (265\ m\mu) = 489$$

$$E_{1\,cm.}^{1\%} (213\ m\mu) = 427$$

A portion (4.26 g.) of the above froth was dissolved in purified acetone (7.85 g.), the colourless solution cooled to −18° C. and distilled water added dropwise until a gel-like turbidity appeared (8 drops). The mixture was warmed slightly until the gel dissolved, then seeded and placed under refrigeration. During the following six days a further 70 drops of water were added. The crystals were filtered off, washed with small portions of a cold (+4°) 50% aqueous acetone solution. The crystals (needles) were then dried over $CaCl_2$ in vacuo.

A recovery of 3.67 g. of vitamin $D_3$ (86% on crystallization) was obtained; M.P. 83–85° C. sinters 81°, $[\alpha]_D^{22} = +85.08°$ (c.=1.006 in acetone).

Light absorption in ethanol:

$$\epsilon\ \text{max.}\ (265\ m\mu) = 18,500$$

$$\epsilon\ \text{max.}\ (213\ m\mu) = 16,300$$

The filtrate from above was evaporated to a froth in vacuo. Weight=0.46 g.

EXAMPLE 5.—KOH HYDROLYSIS OF PURE VITAMIN $D_3$ BENZOATE

A portion of the vitamin $D_3$ benzoate (1.53 g.), as used for the $LiAlH_4$ reduction above was stirred magnetically under reflux, with 10% methanolic KOH solution (7.0 ml.; 4.0 molar proportions) for 35 minutes. The solid mixture (from which potassium benzoate had separated) was diluted with hexane and freed from alkali by water washing. The hexane was evaporated off and the residue (1.18 g.) obtained as a faintly yellow froth. $[\alpha]_D^{24} +73.3°$ (c.=1.0 in acetone).

Infrared examination showed that the hydrolysis was complete and that no methyl benzoate had survived.

The froth (1.18 g.) was dissolved in purified acetone (2.0 g.), cooled to −18° C. and distilled water (4 drops) added. The solution was seeded and refrigerated. After 24 hours had elapsed further 4 drops of water were added and the mixture (from which some crystallization had occurred) was left in the refrigerator for a further 5 days. The crystals were then filtered off, washed with cold aqueous acetone (40 drops of water in 10 ml. acetone) and dried over $CaCl_2$ in vacuo at 8° C. A yield of 0.22 g. (19%) M.P. 82–84° C. was obtained $[\alpha]_D^{24} = +82.14°$ (c.=1.0 in acetone).

Light absorption in ethanol:

$\epsilon$ max. (265 m$\mu$) = 18,600

$\epsilon$ max. (213 m$\mu$) = 16,300

EXAMPLE 6

A portion (50.0 g.) of dried adduct obtained by methanol precipitation of ethanol gum as in Example 1 was dissolved in purified acetone (150 ml.) by warming on the steam-bath under $N_2$ and the solution left at room temperature overnight. The provitamin crystals (100% pure by U.V.) were filtered off, washed with cold acetone and dried in vacuo (25°/10 mm.). Weight 14.53 g. M.P. 139–146° C.

The mother liquor containing the purified adduct was evaporated to a gum in vacuo (30°/10 mm.) and weighed 33.93 g.

The esterification of this product with benzoyl chloride was carried out as described in Example 2 and yielded 43.11 g. (100%) of amber-coloured gum.

The crude esterification gum (43.1 g.) was dissolved in distilled hexane (78 ml.) by warming under $N_2$. The solution was placed in the refrigerator overnight and the provitamin benzoate crystals filtered off, washed with cold hexane, and dried in vacuo (25°/10 mm.). Weight 4.51 g.

The mother liquor was evaporated to an amber froth in vacuo (30°/10 mm.) which contained 37.73 g. of 73% pure vitamin $D_3$ benzoate.

The 37.73 g. was dissolved in purified dioxane (71 ml.) by warming on the steam-bath under $N_2$. Distilled methanol (82 ml.) was then added and the seeded mixture refrigerated. Over the following two days a further 65 ml. of methanol was added and then the crystalline vitamin $D_3$ benzoate was filtered off, washed with cold dioxane-methanol (1:2) and dried in vacuo (25°/10 mm.) for ½ hour and then immediately recrystallized from dioxane (40 ml.) and methanol (55 ml.) for 2 days at refrigerator temperature, then filtered, washed with cold dioxane-methanol (1:2) and dried in vacuo (25°/10 mm.). The vitamin $D_3$ benzoate (91% pure) weighed 21.20 g.

CHROMATOGRAPHY ON "FLORISIL"

A portion (14.0 g.) of the 91% pure vitamin $D_3$ benzoate in distilled hexane (50 ml.) was adsorbed on a column of "Florisil" (210 g.; 15 g. adsorbent per 1 g. steroid), which was developed with hexane (300 ml.) and eluted as follows:

Fraction I

Hexane (2700 ml.) gave 9.27 g. partly crystalline colourless glass.

Light absorption in isooctane:

| $\lambda$ max | 222 | 228 | 266 | |
|---|---|---|---|---|
| $E^{1\%}_{1\,cm}$ | 485 | 478 | 390 | (96.3% pure.) |

Crystallization from dioxane (16 ml.)-MeOH (23.7 ml.) gave 8.44 g. (91% weight recovery) M.P. 109–111° C. (sinters 108.5°), $[\alpha]_D^{24} = +101.6°$ (c.=1.0 in acetone).

Light absorption in isooctane:

| $\lambda$ max | 222 | 227.5 | 266 |
|---|---|---|---|
| $E^{1\%}_{1\,cm}$ | 488 | 483 | 400 |

Recrystallization of 8.4 g. from dioxane (14.5 ml.) and MeOH (21.6 ml.) gave 8.07 g. (96% weight recovery) M.P. 107–109° C. $[\alpha]_D^{24} = +104.0°$ (c.=1.0 in $CHCl_3$).

Light absorption in isooctane:

| $\lambda$ max | 222 | 227.5 | 265–6 |
|---|---|---|---|
| $E^{1\%}_{1\,cm}$ | 495 | 485 | 400 |

Further fractions provided material of slightly lower purity.

$LiAlH_4$ REDUCTION

A portion (1.40 g.) of the twice crystallized product from Fraction I, in dry ether (12 ml.), was added dropwise over 14 minutes to a magnetically stirred suspension of powdered $LiAlH_4$ (0.14 g.) in dry ether (8.5 ml.) at −17° C. under $N_2$. After an additional ½ hour reaction time at (−15° to −12° C.) purified ethyl acetate (0.7 ml.) was added. A gel was formed which (5 minutes later) was broken by the dropwise addition of a saturated aqueous $NH_4Cl$ solution (2.0 ml.). Sodium sulphate was then added to dry the mixture and the solids were filtered off and washed copiously with dry ether. After two water washings the ether was evaporated off in vacuo and the residue taken up in hexane (25 ml.). The hexane solution was then washed 6 times with 35 ml. portions of a water-ethanol solution (9:1) saturated with hexane (to remove the benzyl alcohol formed in the reduction). After a final water wash, the dried ($Na_2SO_4$) hexane solution was evaporated in vacuo (25°/10 mm.) to give 1.09 g. (99%) of colourless vitamin froth.

$$[\alpha]_D^{24} = +80.03°$$

(c.=0.91 in acetone).

Light absorption in ethanol:

| $\lambda$ max | 265 | 212.5 | |
|---|---|---|---|
| $E^{1\%}_{1\,cm}$ | 480 | 426 | (97% pure.) |

The vitamin froth (1.05 g.) was dissolved in purified acetone (1.83 g.) to produce an absolutely colourless solution. After cooling to −18° C., freshly boiled and cooled distilled water (2 drops) was added to turbidity. The mixture was warmed slightly until a clear solution was obtained, then seeded and placed in the refrigerator; crystallization began almost immediately. The mixture was kept in the refrigerator for a total of 6 days during which further 20 drops of water were added portionwise. The crystals (needles) were then filtered off, washed with small portions of cold 50% aqueous acetone and dried in vacuo over $CaCl_2$ at 8°.

A yield of 0.84 g. (80%) of crystalline vitamin $D_3$ was obtained; M.P. 84–85° C. (sinters 82°) $[\alpha]_D^{28} = +85.1°$ (c.=1.0 acetone).

$\epsilon$ max. (265 m$\mu$) = 18,500 (ethanol)

In both of the following Examples 7 and 8, the starting gum was a methanol gum obtained after removal of most of the provitamin and provitamin-vitamin adduct from a crude irradiation mixture by the method given in Example 1. The vitamin gum used was the same for both examples.

EXAMPLE 7.—PREPARATION OF VITAMIN BENZOATE FROM NON-PARTITIONED VITAMIN GUM

The vitamin gum (32.67 g.) was esterified in benzene (120 ml.) with distilled benzoyl chloride (11.3 ml.) in the presence of pyridine (38 ml.) at $+8°$ for 16 hours, and gave, after washing with dilute HCl, bicarbonate and hydrazine solution as described in Example 2, 41.11 g. of the crude ester gum. This was dissolved in warm purified dioxane (83 ml.) diluted with distilled methanol (97 ml.) and kept in the refrigerator for 2 days, a further 65 ml. methanol being added during this period. A yield of 13.5 g. of yellowish sticky solid was obtained. To the 13.5 g. of material was added warm hexane until a solution was obtained and the solution was kept in the refrigerator overnight. The crystals were filtered off, washed with cold hexane and dried in vacuo. This solid was identified as provitamin benzoate and weighed 2.60 g. The mother liquor was evaporated to a semi-solid in vacuo, dissolved in purified dioxane, diluted with distilled methanol and the vitamin benzoate crystallized out in the refrigerator. A yield of 1.45 g. was obtained. No further vitamin benzoate could be isolated.

The vitamin $D_3$ benzoate had M.P. 107–109° (sinters 105°), $[\alpha]_D^{23} +99.7°$ (c.=1.0 CHCl$_3$).

EXAMPLE 8.—PREPARATION OF VITAMIN $D_3$ BENZOATE FROM PARTITIONED VITAMIN GUM

The vitamin gum (32.67 g.) was dissolved in distilled hexane (1300 ml.) previously saturated with 91% aqueous methanol and extracted three times (655 ml. each time) with 91% aqueous methanol (previously saturated with hexane).

The methanol fraction gave 15.4 g. gum $$E_{1\,cm.}^{1\%} (248\, m\mu)\ 144$$

The hexane fraction gave 16.26 g. gum $$E_{1\,cm.}^{1\%} (261\, m\mu)\ 232$$

which was esterified in benzene with benzoyl chloride in the presence of pyridine as previously described and gave 20.4 g. of ester gum. The ester gum was dissolved in purified dioxane (38 ml.) and diluted with distilled methanol (45 ml.). A further 35 ml. methanol was added over a 2-day period in the refrigerator. The crude solid was then filtered off, washed with a cold methanol-dioxane (2:1) solution and dried in vacuo for ½ hour and then immediately recrystallized from dioxane-methanol. This gave 4.60 g. vitamin benzoate slightly contaminated with the provitamin benzoate. The 4.6 g. of material was dissolved in a minimum of warm distilled hexane and placed in the refrigerator overnight. A small crop of crystals (0.1 g.) was filtered off and identified as the provitamin benzoate.

The mother liquor was evaporated to dryness in vacuo and crystallized from dioxane-methanol to give 3.3 g. vitamin $D_3$ benzoate M.P. 106.5–107.5° (sinters 104°), $[\alpha]_D^{24} +94.6°$ (c.=1.0 CHCl$_3$).

The crystalline vitamin $D_3$ benzoate may be used for preparation of vitamin $D_3$ as previously exemplified, or for such other use as desired.

EXAMPLE 9

20 g. of crude dried adduct obtained as set forth in Example 1 was crystallized overnight at room temperature from distilled acetone (60 ml.). In this manner 5.90 g. of 96% pure provitamin was removed. The acetone mother liquor was then evaporated to a yellowish semi-solid in vacuo (25° C.). 13.66 g. of this material was dissolved in distilled benzene (50 ml.) and distilled pyridine (16 ml.) and to the solution at 0° was added benzoyl chloride (5.1 ml.) dropwise, with swirling, over a 5-minute period. The mixture, from which a flocculent precipitate of pyridine hydrochloride began to separate, was kept under refrigeration for 16 hours. The pyridine hydrochloride was then filtered off and washed with benzene. The combined benzene filtrate and washings were washed with 10% HCl, water, 10% NaOH and water until neutral. Evaporation of the dried benzene solution in vacuo at 25° C. gave 18.35 g. of crude ester. The product at this stage was contaminated with benzoyl chloride. Extraction of the benzene solution of the ester with 10% hydrazine solution followed by water washing removed this contaminant. The benzene was removed in vacuo and the residue was dissolved in hexane and again taken down in vacuo to provide a yield of 17.44 g. of solid. The remaining provitamin benzoate was removed from this product by crystallization of the 17.44 g. of material from 35 ml. of distilled hexane at refrigerator temperature. 2.37 g. of pro-vitamin benzoate was obtained. Evaporation of the hexane filtrate in vacuo at 25° C. gave 14.74 g. of vitamin $D_3$ benzoate.

13.3 g. of the vitamin $D_3$ benzoate in 20 ml. of hexane was chromatographed on a column of neutral alumina (400 g. Woelm, activity grade 1). Elution was carried out with hexane, hexane-benzene, benzene and with benzene-ethyl acetate. The benzene-ethyl acetate fraction, upon evaporation, gave 4.14 g. of yellow glass. This product was dissolved in a warm methanol-dioxane mixture which on cooling provided 1.72 g. of crystalline vitamin benzoate. Recrystallization of this product from dioxane and methanol provided 1.60 g. of crystals M.P. 108.5–110° C. (sinters 107°). A further crystallization from dioxane-methanol followed by two recrystallizations from ethyl acetate provided pure vitamin benzoate having the following physical constants: M.P. 110–111° (sinters 109.5°, $[\alpha]_D^{25}= +105.22°$ (c.=1.02 in CHCl$_3$).

$C_{34}H_{48}O_2$.—Found: C, 83.34; H, 9.99; O, 6.83%. Requires: C, 83.55; H, 9.90; O, 6.55%.

Light absorption in isooctane:

| | | | |
|---|---|---|---|
| λ max. | 222 | 227.5 | 265 |
| $E_{1\,cm.}^{1\%}$ | 500 | 493 | 405 |
| ε max. | 24,400 | 24,000 | 19,700 |

This material was tested for vitamin D activity in rats and found to have an activity of 15,000,000 international units per gram.

EXAMPLE 10

Crude vitamin $D_3$ benzoate (ca. 90% pure) was dissolved in hexane and adsorbed on a column of "Florisil" (ca. 30 g./g. steroid). The chromatogram was developed with the same solvent and the vitamin benzoate eluted with hexane-benzene (9:1). The eluent was collected in six fractions of 350, 200, 200, 300 and 350 ml., and the products obtained on evaporation were crystallized separately once from dioxane-methanol. The benzoates obtained from fractions 2 and 3, which constituted the major product, had physical constants (M.P., U.V., I.R. and $[\alpha]_D$) identical with those of the pure vitamin ester and consequently were utilized for subsequent conversion to the free vitamin. LiAlH$_4$ reduction of the combined crystallized fractions 2 and 3 proceeded readily to give free vitamin of 93% purity, in nearly quantitative yield, as a colourless froth. Crystallization of the latter from aqueous acetone in the usual manner furnished, in 36% yield, crystalline vitamin $D_3$, M.P. 82.5–84.5°, further characterized by conversion to the 3,5-dinitrobenzoate.

EXAMPLE 11

In another chromatographic purification, the crude vitamin $D_3$ benzoate (ca. 90% pure; obtained from a different batch) was absorbed on a smaller column of "Florisil" (16 g./g. steroid) and the vitamin ester eluted with hexane-benzene (9:1) as before, the eluates being collected, this time, in one lot. Removal of the solvent provided a partly crystalline glass of about 94.6% purity. Two crystallizations of the residue from dioxane-methanol followed by LiAlH₄ reduction as before gave the free vitamin as a colourless froth which was crystallized twice from aqueous acetone to provide pure crystalline vitamin D₃.

It will be seen from the foregoing examples that crystalline vitamin D₃ can be obtained in good yield from various sources through the use of the intermediate vitamin D₃ benzoate. Approximately 50% recovery based on the estimated vitamin content of the starting material has been obtained by use of the vitamin-provitamin adduct.

LiAlH₄ reduction offers decided advantages over the KOH hydrolysis for the conversion of vitamin benzoate into free vitamin. The purified benzoate after reduction with LiAlH₄ gave an 86% yield of crystalline vitamin D₃ (Example 4). When this same benzoate was hydrolyzed with hot methanolic KOH, the resultant vitamin froth crystallized only in a 19% yield (Example 5).

The overall process, in its preferred embodiment, for production of crystalline vitamin D₃ from an irradiation mixture, consists essentially of the following stages:

(1) Isolation of the crude adduct, by methanol crystallization, from the ethanol-treated irradiation gum with concomitant production of an enriched methanol-gum.

(2) Enrichment of the crude adduct by acetone treatment, thereby recovering directly reusable provitamin in ca. 30% weight yield, and enrichment of the methanol gum by partitioning.

(3) Esterification of the vitamin enriched adduct and/or enriched methanol gum with benzoyl chloride in benzene and pyridine. A feature of this reaction is the facile removal of the excess benzoyl chloride by washing the reaction mixture with a hydrazine solution. A further portion of provitamin (as the benzoate) is then removed by hexane treatment of the esterification gum. In this manner (after hydrolysis and purification) reusable provitamin is recoverable.

(4) Crystallization of the provitamin-freed esterification gum from dioxane-methanol to give a crystalline vitamin D₃ benzoate of ca. 90–95% purity.

(5) Further purification by chromatography on a column of alumina or other adsorbents followed by crystallization from solvents so as to obtain a vitamin D₃ benzoate which will yield a crystallizable vitamin froth upon reduction with LiAlH₄.

(6) Reduction of the substantially pure crystalline vitamin benzoate with LiAlH₄ to supply a theoretical yield of vitamin froth which will undergo crystallization from aqueous acetone in ca. 80% yield.

It will be understood that the features exemplified by the individual stages of the preferred procedure may be utilized in other combinations with conventional steps, and in some instances in analogous processes. Thus, the use of hydrazine for removal of excess benzoyl chloride is adapted to various esterification procedures utilizing this reagent. For example, this technique may be used in the preparation of cholesterol benzoate from cholesterol and benzoyl chloride, wherein the excess benzoyl chloride is often a troublesome problem.

The temperatures set forth in the foregoing specification are in degrees centigrade and all operations were conducted where possible under an inert atmosphere. Where the word vitamin is used, it will be understood that reference is being made to vitamin D₃.

We claim:

1. Vitamin D₃ benzoate in the form of a colorless crystalline solid characterized by melting within the range of 104–109° C., by a specific rotation $[\alpha]_D^{25}$ +104°±4° in chloroform, and the following light absorption properties in isooctane:

$\lambda_{max.}$ 222 m$\mu$ ($E_{1cm}^{1\%}$ ca. 498), $\lambda_{max.}$ 227–228 m$\mu$ ($E_{1cm}^{1\%}$ ca. 490), $\lambda_{max.}$ 266 m$\mu$ ($E_{1cm}^{1\%}$ ca. 402)

2. A process for the production of crystalline vitamin D₃ benzoate comprising: esterifying vitamin D₃ material in organic solvent medium with a reagent providing a benzoyl group to provide a reaction mixture containing vitamin D₃ benzoate, separating vitamin D₃ benzoate from the reaction mixture by crystallization from a solvent, purifying the separated vitamin D₃ benzoate by chromatography and crystallizing the purified vitamin D₃ benzoate from a solvent.

3. A process for the production of crystalline vitamin D₃ benzoate, comprising: esterifying vitamin D₃ with benzoyl chloride in benzene-pyridine to provide a reaction mixture containing vitamin D₃ benzoate, removing excess benzoyl chloride by washing the reaction mixture with hydrazine solution, and recovering vitamin D₃ benzoate from the reaction mixture by crystallization from an organic solvent.

4. In a process for the production of sterol benzoates wherein a sterol is reacted with benzoyl chloride to provide a mixture of the sterol benzoate and excess benzoyl chloride, the improvement comprising removing excess benzoyl chloride from the reaction mixture by washing said mixture with hydrazine solution.

5. A process for the production of crystalline vitamin D₃ benzoate, comprising: esterifying an irradiation product containing vitamin D₃ and provitamin with benzoyl chloride to provide a reaction mixture containing the benzoates of provitamin and vitamin D₃, removing excess benzoyl chloride from the mixture, removing provitamin benzoate from the mixture by crystallization from a solvent, evaporating the solvent to provide a residue containing vitamin D₃ benzoate, crystallizing the vitamin D₃ benzoate from a solvent and purifying the vitamin D₃ benzoate by chromatography on an adsorbent material followed by further crystallization from a solvent.

6. The process of claim 5 wherein the adsorbent material is neutral alumina.

7. The process of claim 5 wherein the adsorbent material is a magnesium silicate.

8. The process of claim 5 wherein the vitamin D₃ benzoate after removal of the provitamin benzoate is crystallized from methanol-dioxane.

9. A process for the production of substantially pure crystalline vitamin D₃ benzoate, comprising: esterifying a provitamin-vitamin D₃ adduct with benzoyl chloride to provide a mixture containing the benzoates of provitamin and vitamin D₃, removing excess benzoyl chloride from the mixture by washing with hydrazine, removing provitamin benzoate from the mixture by crystallization from hexane, crystallizing the remaining vitamin D₃ benzoate from dioxane-methanol, purifying the vitamin D₃ benzoate crystals by dissolution in a solvent and chromatography on a magnesium silicate adsorbent followed by recrystallization from dioxane-methanol.

10. The process of claim 9 wherein the proportion of magnesium silicate adsorbent to vitamin D₃ benzoate utilized for chromatography is at least about 15 to 1 by weight.

11. A method for the production of vitamin D₃, comprising: subjecting vitamin D₃ benzoate to reductive cleavage by treatment with a metallic hydride at a temperature below room temperature to thereby provide a mixture of vitamin D₃ and benzyl alcohol, and separating the vitamin D₃ from the mixture.

12. The method of claim 11 wherein said metal hydride is lithium aluminum hydride.

13. A method for the production of crystalline vitamin D₃, comprising: subjecting substantially pure crystalline vitamin D₃ benzoate to reductive cleavage by treatment with lithium aluminum hydride at a temperature below room temperature to thereby provide a mixture of vitamin D₃ and benzyl alcohol, separating the vitamin D₃ from the mixture, and recrystallizing said vitamin D₃ from a solvent.

14. A process for the production of crystalline vitamin D₃, comprising: dissolving an ethanol-treated 7-dehydrocholesterol irradiation gum in methanol, crystallizing an adduct of provitamin-vitamin $D_3$ from the methanol solution, removing provitamin from said adduct by crystallization from acetone to provide a vitamin $D_3$ enriched material, treating the enriched material with benzoyl chloride to provide a reaction mixture containing the benzoates of provitamin and vitamin $D_3$ and excess benzoyl chloride, washing the reaction mixture with hydrazine solution to remove the excess benzoyl chloride, precipitating provitamin benzoate from a solvent, recovering the vitamin $D_3$ benzoate by crystallization from dioxane-methanol, further purifying the crystallized vitamin $D_3$ benzoate by chromatography on a synthetic magnesium silicate, said silicate being present in a ratio of at least 15 parts by weight to 1 part by weight of the vitamin $D_3$ benzoate, recrystallizing said vitamin $D_3$ benzoate, cleaving said vitamin $D_3$ benzoate with lithium aluminum hydride to provide a mixture of vitamin $D_3$ and benzyl alcohol, recovering the vitamin $D_3$ from the mixture, and crystallizing said vitamin $D_3$ in substantially pure form from a solvent.

15. A process for the production of vitamin $D_3$ benzoate, comprising: treating a 7-dehydrocholesterol irradiation mixture to remove at least a portion of provitamin and an adduct of provitamin-vitamin $D_3$ to thereby provide a vitamin $D_3$ enriched material, esterifying the said vitamin $D_3$ enriched material with a reagent providing a benzoyl group to provide a mixture of vitamin $D_3$ benzoate and provitamin benzoate, removing provitamin benzoate from the mixture by crystallization from a solvent and crystallizing the remaining vitamin $D_3$ benzoate from a solvent.

16. The process of claim 15 wherein the enriched vitamin $D_3$ material after removal of provitamin and provitamin-vitamin $D_3$ adduct is further enriched by solvent partitioning between a pair of immiscible solvents.

17. A process for the production of crystalline vitamin $D_3$ comprising: dissolving an ethanol-treated 7-dehydrocholesterol irradiation gum in methanol, crystallizing an adduct of provitamin-vitamin $D_3$ from the methanol solution, evaporating the methanol solution to provide a vitamin enriched gum, partitioning said enriched gum between aqueous methanol and hexane, evaporating the hexane fraction to provide a material further enriched in vitamin $D_3$, cleaving said adduct to remove provitamin and provide another vitamin $D_3$ enriched material, esterifying said vitamin $D_3$ enriched materials with benzoyl chloride to provide a reaction mixture containing vitamin $D_3$ benzoate, recovering said vitamin $D_3$ benzoate from the reaction mixture, purifying said recovered vitamin $D_3$ benzoate and crystallizing the purified material from a solvent, cleaving the crystalline vitamin $D_3$ benzoate by treatment with lithium aluminum hydride in a solvent medium to thereby provide free vitamin $D_3$, and recovering said free vitamin $D_3$ from the reaction mixture.

18. A process for the production of vitamin $D_3$ benzoate, comprising: solvent treating a 7-dehydrocholesterol irradiation mixture to remove at least a portion of provitamin to thereby provide a vitamin $D_3$ enriched material, esterifying said vitamin $D_3$ enriched material with a reagent providing a benzoyl group to provide a mixture of vitamin $D_3$ benzoate and provitamin-benzoate, removing provitamin-benzoate from the mixture by crystallization from a solvent and crystallizing the remaining vitamin $D_3$ benzoate from a solvent.

19. A process for the production of vitamin $D_3$, comprising: solvent treating a 7-dehydrocholesterol irradiation mixture to remove at least a portion of provitamin to thereby provide a vitamin $D_3$ enriched material, esterifying said vitamin $D_3$ enriched material with a reagent providing a benzoyl group to provide a mixture of vitamin $D_3$ benzoate and provitamin-benzoate, removing provitamin-benzoate from the mixture by crystallization from a solvent, purifying the remaining vitamin $D_3$ benzoate by chromatography, and subjecting the purified vitamin $D_3$ benzoate to reductive cleavage by treatment with lithium aluminum hydride.

References Cited by the Examiner
UNITED STATES PATENTS

| | | | |
|---|---|---|---|
| 2,707,710 | 5/55 | Velluz et al. | 260—397.2 |
| 2,776,304 | 1/57 | Klein et al. | 260—397.2 |
| 2,840,575 | 6/58 | Koevoet et al. | 260—397.2 |

OTHER REFERENCES

Nickon et al.: J.A.C.S., vol. 83, March 20, 1961.

LEWIS GOTTS, *Primary Examiner.*